Aug. 25, 1970   N. P. MINCHOKOVICH, SR   3,525,219
HYDRAULIC TORQUE CONVERTER
Filed Sept. 6, 1968   2 Sheets-Sheet 1
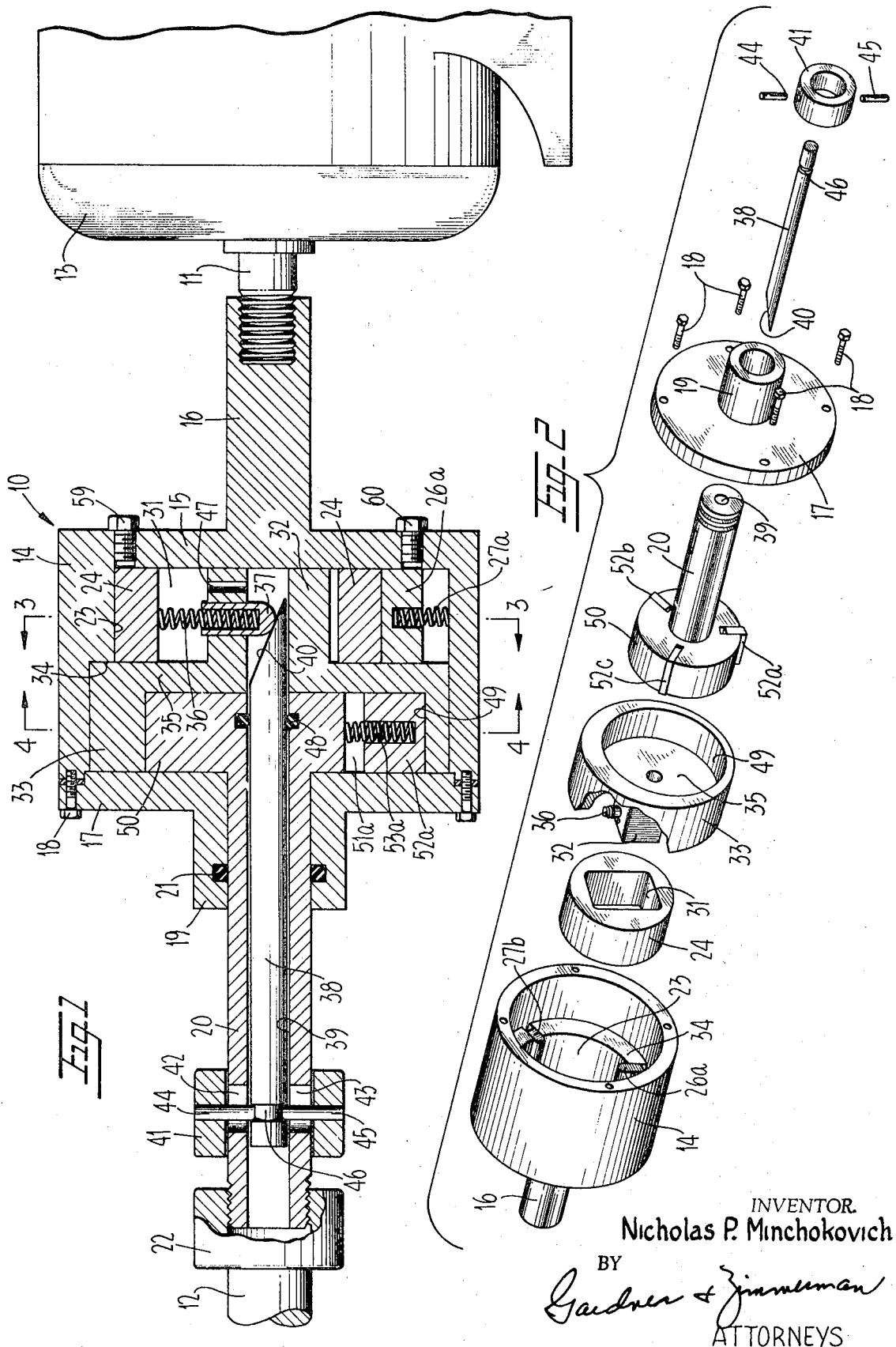
INVENTOR.
Nicholas P. Minchokovich
BY
Gardner & Zimmerman
ATTORNEYS

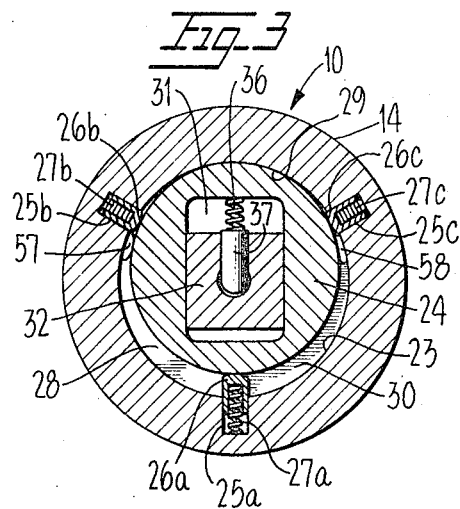
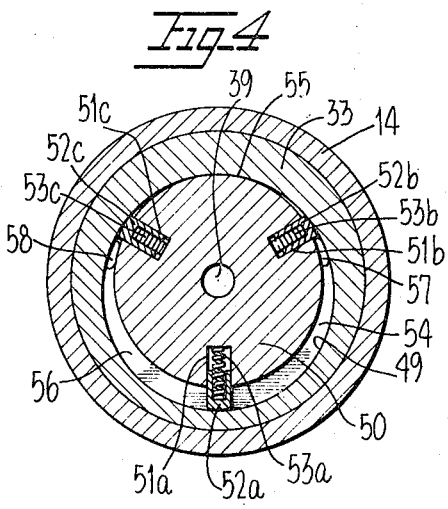
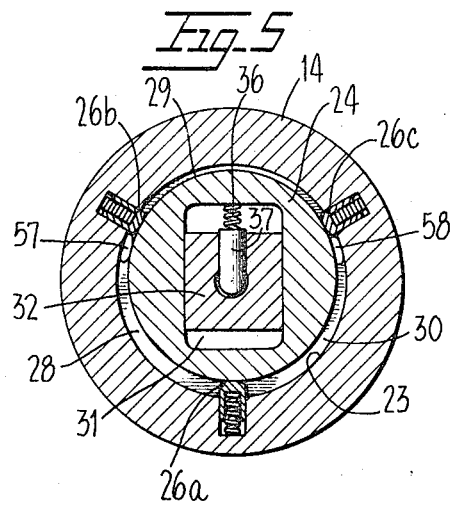
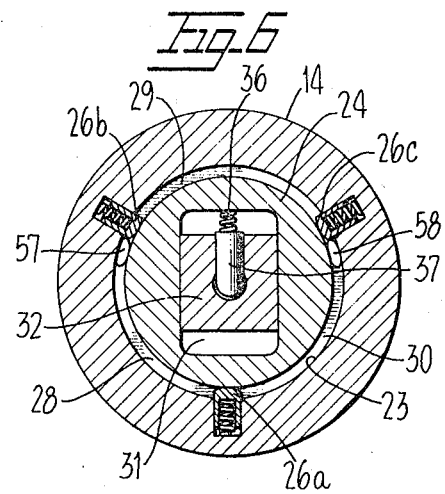

United States Patent Office 3,525,219
Patented Aug. 25, 1970

3,525,219
HYDRAULIC TORQUE CONVERTER
Nicholas P. Minchokovich, Sr., 982 Sycamore Road,
Pleasanton, Calif. 94566
Filed Sept. 6, 1968, Ser. No. 758,088
Int. Cl. F16d *31/06, 33/00;* F04c *15/04*
U.S. Cl. 60—53
12 Claims

ABSTRACT OF THE DISCLOSURE

A hydraulic torque converter is described which provides an infinitely variable ratio between the velocities of the input and output shafts thereof, and which requires no support structure or mounting means other than the respective connections of its input and output shafts to the drive and driven shafts to be associated therewith. The torque converter comprises rotary vane pump and rotary vane motor assemblies, the first of which includes a housing equipped with an input shaft so as to be rotatably driven thereby and provided within its interior with a pump chamber coaxially disposed with respect to the axis of rotation of the input shaft and housing. A pump rotor is supported within the pump chamber for rotation relative thereto, and it is engaged by a plurality of angularly spaced vanes carried by the housing within the pump chamber. The rotor is substantially smaller than the pump chamber and is automatically displaced therewithin in accordance with the value of the load on the output shaft between a maximum eccentric position defining a one-to-one velocity ratio between the input and output shafts of the converter, an inner concentric position defining a substantially zero velocity for the output shaft, and intermediate positions defining various intermediate velocity relationships. The motor assembly includes a motor housing supported within the pump housing and defining a motor chamber offset from the axis of rotation of the output shaft of the converter, which output shaft is equipped with a concentric rotor rotatably mounted within the motor chamber and equipped with a plurality of angularly spaced vanes engaging the walls thereof. The pump and motor chambers are interconnected by flow ports and filled with a hydraulic fluid, and any tendency toward relative rotation between the pump housing and pump rotor tends to rotate the motor rotor through the fluid coupling defined between the pump and motor chambers at a velocity corresponding to the output load.

This invention relates to a torque converter and, more particularly, to a hydraulic torque converter operated by the development of hydrostatic pressures therewithin. The converter is useful in a great variety of environments in which it is desirable to provide an infinitely variable velocity ratio between a drive shaft and a shaft to be driven thereby, but is especially useful in installations requiring relatively low power transmission between such shafts.

An object, among others, of the present invention is to provide an improved hydraulic torque converter having an infinitely variable velocity ratio between its input and output shafts. Another object of the invention is in the provision of a hydraulic torque converter requiring no external supports or mounting structure therefor other than the means for connecting its input shaft with a drive means and its output shaft with a load to be driven.

Still another object is that of providing a hydraulic torque converter operative as a consequence of hydrostatic pressures developed within it and which, in the substantially one-to-one velocity ratio between the input and output shafts, functions at a very high efficiency since there are substantially no fluid friction losses, the hydraulic fluid in such condition of the converter acting much in the nature of a rigid mechanical linkage. A further object of the invention is to provide a small, compact, structurally simple, inexpensive hydraulic torque converter requiring little maintenance and having a long life. Additional objects and advantages of the invention, especially as concerns particular features and characteristics thereof, will became apparent as the specification proceeds.

An embodiment of the invention is illustrated in the accompanying drawings, in which:

FIG. 1 is a longitudinal sectional view of a torque converter embodying the invention;

FIG. 2 is an exploded perspective view of the components of the torque converter shown in spaced apart relation, the order of such components being reversed from that shown in FIG. 1;

FIG. 3 is a transverse sectional view, taken along the line 3—3 of FIG. 1, illustrating the pump assembly when the velocity relationship of the output shaft to the input shaft is a one-to-one ratio;

FIG. 4 is a transverse sectional view, taken along the line 4—4 of FIG. 1, illustrating the motor assembly;

FIG. 5 is a transverse sectional view similar to that of FIG. 3, but showing the pump assembly when the velocity relationship of the output shaft to the input shaft is a ratio of less than one; and FIG. 6 is a transverse sectional view similar to that of FIGS. 3 and 5, but showing the pump assembly when the relationship of the output shaft to the input shaft is zero-to-one.

The torque converter in its entirety as illustrated in FIG. 1 is designated with the numeral 10 and is a compact, relatively small unit in relation to the power delivered thereby, requiring no special mounting or support structures since it can be directly connected between a power-driven input shaft 11 and an output shaft 12. The drive shaft 11 may be driven from any suitable power source or prime mover, and in the particular arrangement illustrated in the drawings, it constitutes the shaft of an electric motor 13. However, as respects the present invention, the motive source for the input shaft is not critical. Correspondingly, the driven shaft 12 may be connected to any load or utilization device even though it may provide variable loads, wherefore greater torque delivery to the shaft 12 may be required at certain times than at others, in which event an infinitely variable velocity-torque relationship is advantageously provided by the torque converter 10.

The torque converter 10 operates essentially on hydrostatic pressure principles and has a rotatable pump housing 14 of generally cylindrical configuration closed at one end by a transverse wall 15 equipped with an input shaft 16 projecting longitudinally therefrom, which shaft is threadedly or otherwise secured to the drive shaft 11. The pump housing 14 is closed at its opposite end by transverse wall structure 17 removably secured to the pump housing 14 by a plurality of cap screws 18 which tightens the wall structure 17 against a gasket interposed between it and the pump housing to provide a liquid-tight seal therebetween. A sleeve 19 extends longitudinally from the wall structure 17 and is coaxially circumjacent an output shaft 20 which is freely rotatable with respect to the collar and may be sealingly related thereto by a packing gland or O-ring gasket 21. The output shaft 20 may be connected to the driven shaft 12 in any suitable manner, as by means of a threaded coupling 22 effective to prevent relative rotation therebetween.

The pump housing 14 defines a pump chamber 23 that is substantially cylindrical and coaxial with the axis of rotation of the housing, as is most apparent in FIG. 3. Mounted within the pump chamber 23 is a cam or pump rotor 24 which is also cylindrical and is considerably smaller in diameter than the diameter of the pump chamber 23. The pump rotor 24 is rotatable relative to the pump housing 14, and together they form a rotary vane pump assembly. In this respect, the pump housing 14 is provided within the chamber 23 thereof with a plurality of angularly spaced slots or recesses, there being three in number equally spaced by 120°. For purposes of identification, the slots are denoted with the numerals 25a, 25b and 25c, and respectively mounted therein are vanes 26a, 26b and 26c which are generally rectangular and are radially displaceable within their respectively associated slots. The vanes 26 are adapted to ridingly engage the cylindrical surface of the pump rotor 24, and are biased inwardly thereagainst by helical compression springs 27a, 27b and 27c.

As will be brought out in greater detail hereinafter, the pump rotor 24 is bodily displaceable within the pump chamber 23 between a plurality of positions, certain of which are respectively shown in FIGS. 3, 5 and 6, the latter being a position of substantial concentricity or coaxiality with the chamber 23, and the other two being eccentric positions relative thereto. The vanes 26 effectively divide the chamber 23 into smaller volumes which (referring to FIGS. 5 and 6 in particular) are denoted 28, 29 and 30. The pump rotor 24 is provided with a large opening 31 therethrough which is generally rectangular, as shown in FIG. 3, and is adapted to receive a longitudinally extending collar or hub 32 provided by a motor housing 33 of generally cylindrical configuration mounted within the pump housing 14 adjacent the open end portion thereof.

Motor housing 33 is rotatable relative to the pump housing 14 and is confined longitudinally therewithin in one direction by the wall structure 17 and in the opposite direction by a shoulder or abutment 34 provided by the pump housing 14. The motor housing 33 is closed at the inner end thereof by a transverse wall 35 that is substantially parallel to the abutment 34, and the collar 32 extends longitudinally from the wall 35 in coaxial relation with the axis of rotation of the pump housing 14 and axis of rotation of the motor housing 33. The transverse wall 35 of the motor housing 33 closes the pump chamber 23 in which the pump rotor 24 is mounted; and by referring to FIG. 3, it will be observed that the collar 32 upon which the pump rotor is mounted is generally square-shaped and cooperates with the pump rotor so as to prevent relative rotation therebetween but to permit the pump rotor to be displaced bodily thereto between the extreme positions shown in FIGS. 3 and 6.

The pump rotor 24 is resiliently biased toward the maximum eccentric location thereof shown in FIG. 3 by a helical compression spring 36 which at one end bears against an inner surface of the pump rotor and at its other end seats within a plunger 37 radially displaceable through a bore provided therefor in the collar 32. The position of the plunger 37 is determined by adjustment of a rod 38 which is longitudinally displaceable through a composite bore or passage 39 provided therefor in the output shaft 20 of the torque converter and motor housing 33 thereof. The inner end of the rod 38 is inclined, as shown at 40; and, therefore, as the rod is displaced toward the right (as viewed in FIG. 1), the plunger 37 is forced radially outwardly thereby increasing the compressive force exerted by the spring 36 against the pump rotor 24.

Adjustment of the rod 38 is effected from the outside of the output shaft 20 by means of an adjusting nut or collar 41 which is slidably circumjacent the shaft 20. Such collar 41 is longitudinally movable along shaft 20 within the limits defined by longitudinally extending diametrally oriented slots 42 and 43 which is respectively pass aligned pins 44 and 45 therethrough that project inwardly from the collar. At their inner ends, the pins 44 and 45 seat within an annular channel 46 formed in the rod 38 and permit it to rotate relative thereto. Means (not shown but which can take any conventional form, as a set screw, for example) can be used to fixedly locate the collar 41 in any position of adjustment thereof along the output shaft 20, and the position of the collar 41 will determine the location at which the plunger 37 seats upon the inclined end 40 of the rod 38 and, therefore, determines the compressive force exerted by the spring 36 against the pump rotor 24. The hollow interior or passage 39 of the output shaft 20 communicates with the pump chamber 23 through a passage 47 in the collar 32, and an O-ring seal 48 circumjacent the rod 38 prevents the escape of hydraulic fluid along the rod.

As shown best in FIG. 4, the motor housing 33 defines a motor chamber 49 therewithin which is cylindrical in configuration but offset or eccentrically oriented relative to the coincident axes of rotation of the pump housing 14 and output shaft 20. Rotatably mounted within the motor chamber 49 is a motor rotor 50 which is cylindrical and is somewhat smaller in diameter than the diameter of the motor chamber 49. The motor rotor 50 is at the inner end of the output shaft 20, and may be integral therewith as shown in FIG. 1. The rotor 50 is concentric or coaxial with the axis of rotation of the shaft 20, and it is provided with a plurality of angularly spaced slots or recesses therein, there being three in the specific structure being considered, equally spaced by 120° and respectively denoted with the numerals 51a, 51b and 51c. Respectively mounted in the slots 51 are a plurality of generally rectangular vanes 52a, 52b and 52c which are respectively biased outwardly in radial directions by helical compression springs 53a, 53b and 53c.

It may be observed in FIG. 4 that the vanes 52 effectively divide the motor compartment 49 into three chambers respectively denoted 54, 55 and 56, the chamber 55 being substantially non-existent or having a very small volume, as shown in FIG. 4. Communication is established between the pump chamber 23 and motor chamber by a pair of ports or apertures 57 and 58 formed in the transverse wall 35 of the motor housing 33; and as the two compartments are illustrated in FIGS. 3 and 4, the port 57 establishes communication between the compartment 28 of the pump chamber and compartment 54 of the motor chamber, and the port 58 similarly establishes communication between the compartment 30 of the pump chamber and compartment 56 of the motor chamber.

The pump chamber 23 and motor chamber 49 are adapted to be completely filled with a hydraulic fluid, and such filling thereof may be accomplished through apertures provided for this purpose in the transverse wall 15 of the housing 14, and which apertures directly communicate with the pump chamber. The apertures are disposed along the outer extermities of such pump chamber, as shown in FIG. 1, and cap screw closures therefor are respectively denoted with the numerals 59 and 60. Any conventional hydraulic fluid generally used for torque converter purposes can be employed as, for example, a light-weight or relatively non-viscous oil.

In operation of the torque converter 10, and assuming the connection thereof between a prime mover or drive shaft 11 and a load or shaft 12, as shown in FIG. 1, rotation of the drive shaft 11 will rotate the input shaft 16 of the torque converter and the pump housing 14 which is attached thereto. Rotation of the pump housing 14 will cause the wall structure of closure 17 to rotate therewith since it is secured thereto by the cap screws 18, and such closure will rotate freely relative to the output shaft 20 which may remain stationary under high load conditions. In the ordinary instance in which an excessive load is not imposed on the driven shaft 12, the velocity relationship of the output shaft 20 to the input shaft 16 will be substantially a one-to-one ratio, and the pump assembly will have the general configuration shown in FIGS. 1 and 3 in which the pump rotor 24 is displaced radially outwardly by the spring 36 into substantial abutment with a wall portion of the pump chamber 23, whereupon the pump rotor will be in its maximum position of eccentricity relative to the pump chamber 23.

Since the pump chamber 23 and motor chamber 49 are completely filled with a hydraulic fluid, the two compartments 28 and 30 of the pump chamber (as shown in FIG. 3) will be completely filled with such fluid. Assuming the drive shaft 11 is rotating so as to drive the pump housing 14 in a clockwise direction, as viewed in FIG. 3, the vane 26a will be carried therewith wherefore it will tend to rotate in a clockwise direction relative to the pump rotor 24, thereby tending to decrease the volume of the compartment 26, which progressively diminishes in size in the clockwise direction, and exhaust fluid through the aperture 57 and into the motor chamber 49.

Referring to FIG 4, it will be seen that fluid tending to be exhausted from the compartment 28 of the pump chamber, through the port 57, into the compartment 54 of the motor chamber 49 will endeavor to enlarge the compartment 54 so as to accommodate the increasing volume of such fluid tending to be pumped thereinto, and such effort toward enlargement is accomplished by the fluid pushing against the blade 52a carried by the motor rotor 50, thereby rotating it in a clockwise direction as viewed in FIG. 4. As a consequence, the output shaft 20 to which the motor rotor 50 is connected will be rotated thereby. Provided that the load on such output shaft 20 (i.e., the driven shaft 12) is sufficiently low to permit a substantially one-to-one ratio between the velocities of the output shaft 20 and input shaft 16, the motor rotor 50 will rotate in enforced synchronism with the pump housing 14 and there will be substantially no actual movement of fluid between the pump and motor chambers, the hydraulic fluid simply acting much in the manner of a rigid mechanical linkage drivingly coupling the input shaft 16 with the output shaft 20. Accordingly, in this mechanical configuration of the torque converter, the efficiency thereof is exceedingly good because there are substantially no losses due to liquid and mechanical friction, hysteresis, etc.

Assuming the operational conditions just discussed in which the input and output shafts 16 and 20 of the torque converter are rotating at substantially the same velocities, and then consider that the load imposed upon the output shaft is suddenly increased, the angular velocity of the output shaft 20 will decrease but the torque imparted thereto will increase correspondingly. The accomplishment of such increased torque, decreased velocity relationship is effected automatically within the pump assembly by displacement of the pump rotor 24 radially inwardly against the biasing force of the spring 36 from the maximum position of eccentricity shown in FIG. 3 toward the centered coaxial position thereof shown in FIG. 6. Depending upon the magnitude of the load, the intermediate position assumed by the rotor might be, for example, that illustrated in FIG. 5.

In order to visualize this occurence, and considering FIG. 4, when the torque converter is in a one-to-one velocity relationship the motor rotor 50 is rotating in a clockwise direction because of the pressure force exerted by the hydraulic fluid against the vane 52a. If the resistance to rotation exhibited by the motor rotor 50 is suddenly increased owing to an increased load on the output shaft 12, it will tend to rotate at a slower angular velocity which is the equivalent of tending to be displaced in a counter-clockwise direction (as viewed in FIG. 4) relative to the motor housing 33 and aperture 57. As a consequence of such tendency toward relative rotation, the volume of the compartment 54 will decrease because it diminishes in size toward the aperture 57, thereby exhausting fluid through the aperture and into the compartment 28 of the pump chamber 23.

Since rotation of the pump housing 14 is already tending to decrease the size of the pump compartment 28, as explained heretofore, but because the compartment 28 must enlarge in order to accommodate the extra fluid being exhausted thereinto through the aperture 57, the only way such enlargement can be effectively accomplished is by the resultant increase in pressure within the compartment 28 displacing the pump rotor 24 radially inwardly and into the position shown in FIG. 5, thereby by-passing fluid from the aggregate volume defined by the interconnected pump and motor compartments 28 and 49 (which aggregate volume is decreasing) and into the increasing aggregate volume defined by the pump and motor compartments 30 and 56 which are interconnected by the port 58. This relationship continues to obtain so long as the load on the output shaft 20 remains the same, with the output shaft being driven at a slower velocity than the input shaft 16 but with the torque imparted to the output shaft being increased as a consequence of the relative volumetric changes explained and pressure force development corresponding thereto.

The velocity-versus-torque relationship is infinitely variable so that the position of the pump rotor 24 within the pump chamber 23 is progressively and continuously changeable to accommodate the contemporary load value imposed upon the output shaft 20 via the driven shaft 21 connected thereto. However, should the magnitude of the load imposed upon the output shaft 20 be so great as to constrain the same against rotation, the maximum torque that can be developed by the converter 10 will then be applied to the output shaft 20, but the angular velocity thereof will be substantially zero. The pump assembly of the torque converter will then have the relationship depicted in FIG. 6, in which the pump rotor 24 is coaxially or concentrically positioned within the pump chamber 23.

As a result of such concentricity, the three compartments 28, 29 and 30 into which the pump chamber 23 is sub-divided by the various blades 26 are all the same size so that as the pump housing 14 rotates in a clockwise direction (as viewed in FIG. 6), the volume of the compartment 28 remains substantially invariable as the blade or vane 26 advances toward the port 57 because at the same time the vane 26b is retreating from such port and the volumetric increase defined by the blade retreat is substantially equal to the volumetric decrease tending to be effected by advance of the blade 26a. These same relationships obtain as respects the port 58 and vanes moving theretoward and retreating therefrom. Thus, the fluid (once maximum torque is developed) is circulated about or by-passed through the then uniform-volume pump chamber 23. Whenever the load on the output shaf 20 is decreased, the spring 36 will displace the pump rotor 24 outwardly and into an eccentric position within the pump chamber, whereupon the output shaft 20 will be rotated at a velocity corresponding to the eccentric position of the pump rotor.

It will be appreciated that the hydraulic pressure force required to displace the pump rotor 24 inwardly will depend upon the biasing force exerted thereagainst by the spring 36, wherefore selection of the spring force can be used to determine the torque-velocity relationships of the torque converter. However, for any selected spring 36, the biasing force developed thereby can be adjusted by varying the compression thereof which, as explained hereinbefore can be accomplished by adjusting the position of the rod 38 to change the particular location along the inclined or wedge surface 40 thereof at which the plunger 37 seats thereupon. Thus, for any spring 36, the operating characteristics of the torque converter 10 can be changed within the limits defined by the adjustment mechanism that includes the rod 38, collar 41, slots 42 and 43, and pins 44 and 45.

The torque converter requires no mounting facilities other than the necessary connection of the input and output shafts thereof with a drive shaft and shaft to be driven thereby; it is simple structurally, having no positively manipulatible valves so that there is very little wear and substantially no maintenance required, and it is compact and small for any power rating therefore. It provides an infinitely variable velocity ratio as between the input and output shafts thereof and, since symmetrical, works equally well in either direction so that the direction of rotation of the driven shaft connected thereto can be reversed.

While in the foregoing specification an embodiment of the invention has been set forth in considerable detail for purpose of making a complete disclosure thereof, it will be apparent to those skilled in the art that numerous changes may be made in such details without departing from the spirit and principles of the invention.

What is claimed is:

1. A hydraulic torque converter comprising a rotatable pump housing equipped with an input shaft and defining within its interior a pump chamber substantially concentric with the axis of rotation of said shaft, a rotatable motor housing defining a motor chamber therewithin eccentrically oriented with respect to the axis of rotation thereof, a motor rotor equipped with an output shaft and being rotatably mounted within said motor chamber in substantially coaxial orientation with the axis of rotation of said motor housing, a plurality of angularly spaced vanes located within said motor chamber and dividing the same into compartments and being carried by one of said motor housing and motor rotor so as to rotate therewith and slidably engage the other, a pump rotor mounted within said pump chamber and being connected with said motor housing for rotation therewith relative to said pump housing and being bodily displaceable within said pump chamber between a location substantially coaxial therewith and positions eccentric with respect thereto, means biasing said pump rotor toward a maximum eccentric location within said pump chamber, a plurality of angularly spaced vanes located within said pump chamber and dividing the same into compartments and being carried by one of said pump housing and pump rotor so as to rotate therewith and slidably engage the other, and means interconnecting different compartments of said pump and motor chambers for the flow of hydraulic fluid therebetween.

2. The torque converter of claim 1 in which said motor housing is mounted within said pump housing and is equipped with a transverse wall separating said pump chamber from said motor chamber, and in which said means interconnecting said chambers includes a plurality of openings provided by said transverse wall and defining flow ports interconnecting said chambers.

3. The torque converter of claim 2 in which at least two such compartments are provided within each of said chambers, said ports being respectively associated with the two compartments in each of said chambers so that one port interconnects one compartment in each chamber and another port interconnects the other compartment in each chamber.

4. The torque converter of claim 2 in which displacement of said pump rotor toward the condition of concentricity thereof within said pump chamber causes said compartments therein to maintain a more nearly uniform volume irrespective of relative rotation between said pump housing and pump rotor.

5. The torque converter of claim 2 in which said vanes in said pump chamber are carried by said pump housing, and in which said vanes within said motor chamber are carried by said motor rotor.

6. The torque converter of claim 1 in which said means biasing said pump rotor includes spring structures, and further comprising torque adjustment mechanism including means for selectively changing the biasing force imparted by said spring structure to said pump rotor.

7. The torque converter of claim 6 in which said torque adjusting mechanism includes a rod slidable within a passage provided therefor through said output shaft, motor rotor and motor housing and being provided with an inclined end adjacent said motor housing, said spring structure including a plunger radially movable relative to the axis of rotation of said pump housing and seating upon the inclined end of said rod, a compression spring having one end portion thereof seated within said plunger and the other end bearing against said pump rotor, and adjustment means exteriorly of said output shaft for selectively displacing said rod relative to said plunger to change the point of engagement of the plunger with the inclined end of said rod.

8. The torque converter of claim 1 in which said motor housing is mounted within said pump housing and is equipped with a transverse wall separating said pump chamber from said motor chamber and with a collar projecting into said pump chamber from said transverse wall, and in which means interconnecting said chambers includes a plurality of openings provided by said transverse wall and defining flow ports interconnecting said chambers, said pump rotor having an opening therethrough seating said collar therewithin and being constrained thereon so as to prevent relative rotation therebetween but enabling said pump rotor to be displaced bodily within said pump chamber and relative to said collar and motor housing.

9. The torque converter of claim 8 in which displacement of said pump rotor toward the condition of concentricity thereof within said pump chamber causes said compartments therein to maintain a more nearly uniform volume irrespective of relative rotation between said pump housing and pump rotor and in which said vanes within said pump chamber are carried by said pump housing and those within said motor chamber are carried by said motor rotor.

10. The torque converter of claim 9 in which at least two such compartments are provided within each of said chambers, said ports being respectively associated with the two compartments in each of said chambers so that one port interconnects one compartment in each chamber and another port interconnects the other compartment in each chamber.

11. The torque converter of claim 10 in which said means biasing said pump rotor includes spring structure, and further comprising torque adjustment mechanism including means for selectively changing the biasing force imparted by said spring structure to said pump rotor.

12. The torque converter of claim 10 in which each of said vanes is spring biased toward the component slidably engaged thereby.

References Cited

UNITED STATES PATENTS

| | | |
|---|---|---|
| 2,815,647 | 12/1957 | Albrecht et al. _____ 60—53 |
| 2,936,589 | 5/1960 | Quintilian. |
| 3,108,437 | 10/1963 | Zubaty et al. |
| 3,261,375 | 7/1966 | Berry. |
| 3,266,253 | 8/1966 | Bryant _____ 60—53 |

DONLEY J. STOCKING, Primary Examiner

W. J. KRAUSS, Assistant Examiner

U.S. Cl. X.R.

103—120